Dec. 22, 1931.  T. ZERBI  1,837,845
FUEL TANK ARRANGED ON THE DASHBOARD OF MOTOR VEHICLES
Filed Jan. 4, 1930
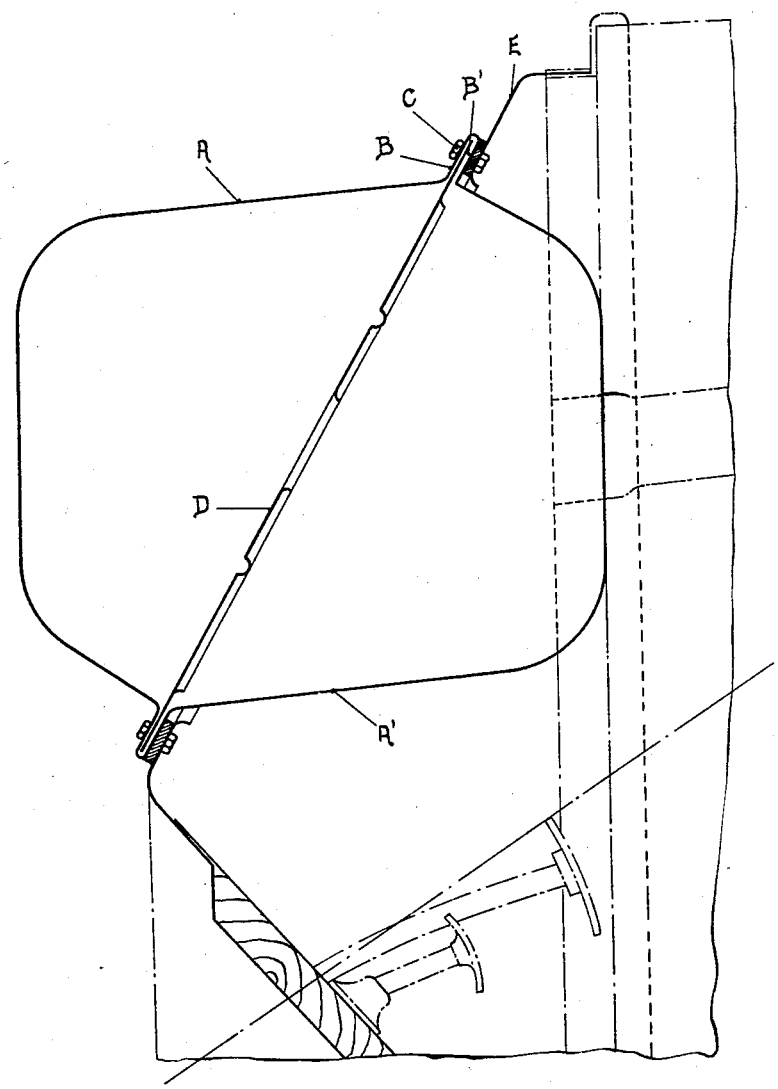
Inventor
Tranquillo Zerbi,
By Henry Orth Jr
atty Patented Dec. 22, 1931

1,837,845

UNITED STATES PATENT OFFICE

TRANQUILLO ZERBI, OF TURIN, ITALY, ASSIGNOR TO FIAT SOCIETÁ ANONIMA, OF TURIN, ITALY

FUEL TANK ARRANGED ON THE DASHBOARD OF MOTOR VEHICLES

Application filed January 4, 1930, Serial No. 418,619, and in Italy March 30, 1929.

This invention relates to fuel tanks arranged on the dash-board of motor vehicles for supplying fuel to the engine by gravity.

The improvements according to this invention consist in the fact that the tank is made in two parts of pressed sheet metal which are symmetrical to each other and symmetrically arranged so as to require but one die for manufacturing them, said parts being provided with upturned edges tightly connected together to form a flange which, according to this invention, is utilized for attaching the tank to the dash-board, in such manner that the tank and dash-board connected together result in a simple and cheap unit.

The accompanying drawing shows, diagrammatically and by way of example, a constructional form of the assembled tank and dash-board.

The tank comprises two symmetrical parts A—A' arranged symmetrically with upturned edges B—B' which are dowelled and soldered together conveniently enclosing the edge of a perforated diaphragm D. The said edges thus form a flange which is secured by means of bolts C to the dash-board E of the motor vehicle, conveniently with the interposition of a packing.

The tank thus forms a unit with the dash-board of which it improves the stiffness by its attachment flange.

What I claim is:

1. In combination with an inclined dash-board wall of a motor vehicle, having a large central opening, a fuel tank in said opening, said tank comprising two equal halves divided according to a substantially diagonal plane corresponding to inclination of the dash, flanges for connecting said parts to the peripheral edge of said opening, the center of gravity of the tank being in the plane of the dash-board wall.

2. In combination with the dash-board wall of a motor vehicle having a large central opening, a fuel tank quadrangular in cross section comprising two equal halves within the opening and divided according to a substantially diagonal plane, flanges at the contact edges of said parts, a plate arranged between the two parts and held between said flanges and means for securing said parts and said diagonal plate to the dash board around said opening so that the center of gravity of the tank is in the plane of the dash-board wall.

3. The combination with an inclined dash-board, of a tank supported by said dash-board and extending through an opening in said dash-board, said tank having a diagonally disposed flange extending entirely around the same said flange engaging the upper side of the inclined dash around the opening therein and secured to the dash, said tank being positioned within the dash opening and in relation to the dash whereby its center of gravity is within the lines of the dash.

In testimony that I claim the foregoing as my invention, I have signed my name.

ING. TRANQUILLO ZERBI.